Dec. 29, 1959   L. S. GUARINO ET AL   2,919,384
HELICOPTER AUTOMATIC ENGINE SPEED SELECTOR AND CONTROL
Filed Dec. 5, 1956   2 Sheets-Sheet 1

INVENTORS
LOUIS S. GUARINO
WILLIAM M. OGDEN
BY
ATTORNEYS

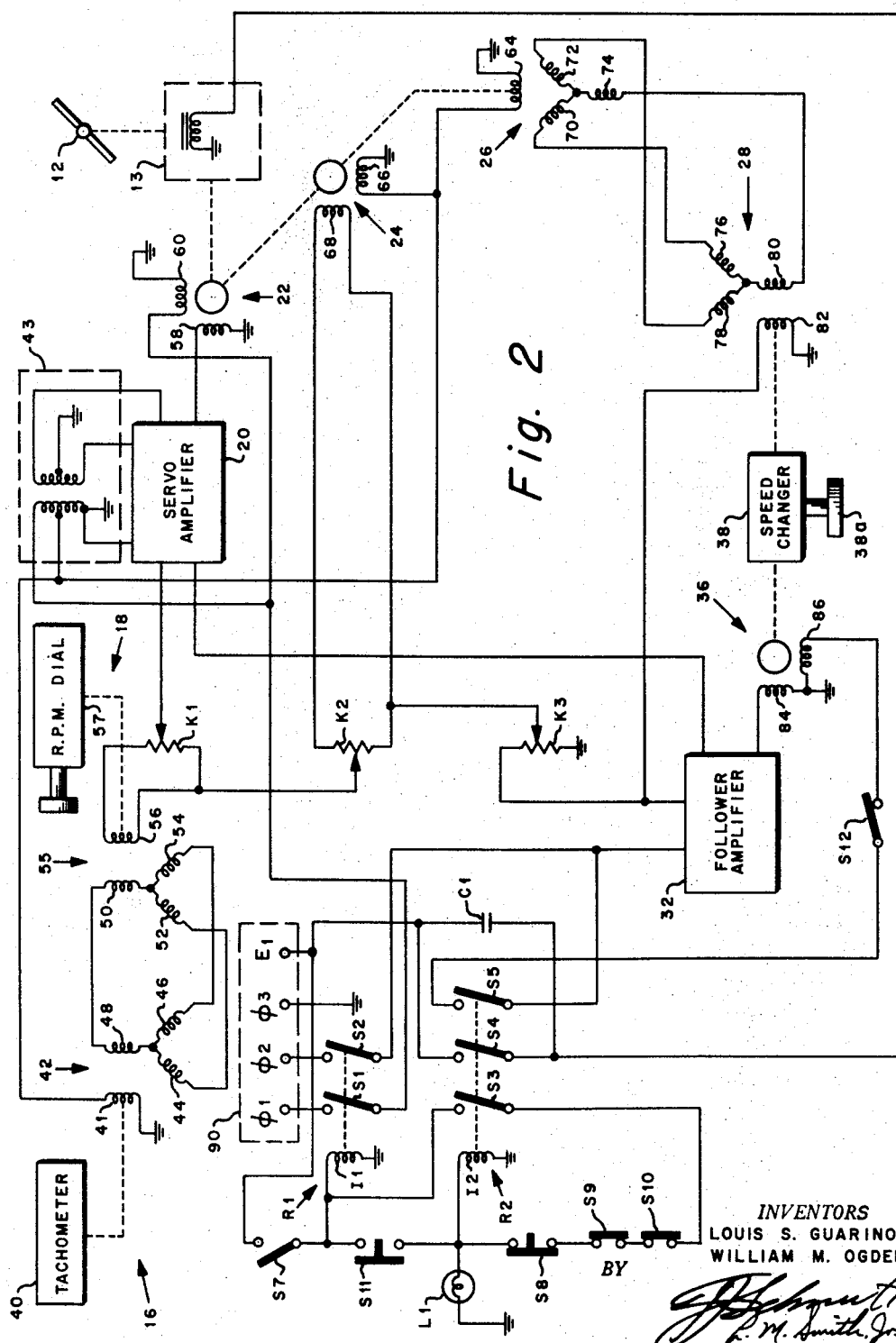

United States Patent Office 2,919,384
Patented Dec. 29, 1959

2,919,384

HELICOPTER AUTOMATIC ENGINE SPEED SELECTOR AND CONTROL

Louis S. Guarino, Hatboro, and William M. Ogden, Newtown Square, Pa.

Application December 5, 1956, Serial No. 626,552

13 Claims. (Cl. 317—5)

(Granted under Title 35, U.S. Code (1952), sec. 266)

The invention described herein may be manufactured and used by or for the Government of the United States of America for governmental purposes without the payment of any royalties thereon or therefor.

The present invention relates to a helicopter rotor and engine speed selector and control which automatically regulates the engine speed at a selected value and which embodies features for insuring close, stable regulation, and compensation for the variable throttle engine control.

During powered flight of a helicopter, the main rotor is geared directly to the engine. Thus, any automatic engine throttle control system would accomplish the desired regulation of rotor speed. However, such control system would have to take into account the facts that (1) any change in rotor pitch requires change in the throttle setting, and (2) the magnitude of throttle control required to cause a given change in speed is a variable which depends upon flight factors such as ambient atmospheric conditions, load, and center of gravity position.

One arrangement for exercising this control utilizes a mechanical arrangement in which the collective rotor pitch is mechanically connected to the throttle by a cam so that a change in pitch will cause a rough synchronization with the throttle. This arrangement is not adequate to make the necessary throttle adjustment to maintain constant r.p.m. within narrow limits. The use of engine governors has also been suggested, but this has been shown to lack the accuracy, close regulation, and selectivity required for good helicopter operation.

The present invention begins with the use of a conventional closed loop servo system wherein a fixed amount of throttle correction would be applied for a given error in speed. However, the servo system is modified in such a way to insure that the proper throttle correction will always be applied irrespective of the condition of the various variable factors noted above which are involved in helicopter and internal combustion engine operation. The proposed servo system operates a a conventional closed loop system but utilizes a method of compensation that is not affected by transient error signals of small duration. For transients of long duration, the compensation described provides a way for retrimming the controls of the new reference data. The apparatus used to accomplish this result is an electro-mechanical follow-up follower servo system inserted in the main servo feedback signal circuit. The follower is sensitive to the feedback voltage to the extent that when any voltage is present the follower servo system is actuated, and operates to decrease the feedback signal. The speed of response of this servo mechanism is purposely made slow by comparison with the helicopter engine response. By virtue of this arrangement, short period transients have practically no effect on the follower, but where there are persistent errors of long duration the arrangement permits the follower to attenuate the follow-up signal until the original r.p.m. is restored. Thus, the throttle is retrimmed to a new position in order to hold the engine at the desired speed. A variable speed control is included in the follower servo mechanism to permit the adaptation of the retrimming speed to various engines.

It is thus a first object of the present invention to provide an automatic engine speed selector and control which will operate within close limits to maintain a selected engine speed.

Another object is to provide an automatic follower control system for a helicopter engine which monitors and controls the rotor speed so that the engine is not affected by transient error signals of small duration and operates as a conventional closed loop.

A further object of the invention is the provision of an automatic engine speed selector and control which is capable of closely regulating the speed of an internal combustion engine in accordance with a selected speed taking into account all the variable factors which affect the magnitude of throttle control required to cause a given change in speed.

Another object of the present invention is the provision of an automatic engine speed selector and control utilizing a conventional closed loop servo system modified with an electro-mechanical follow-up follower loop inserted in the servo feedback signal circuit sensitive to the feedback voltage to the extent that when any voltage is present the follower servo mechanism is actuated to decrease the feedback signal.

A final object of the present invention is the provision of an automatic engine speed selector and control utilizing a secondary loop embodying features for selecting the proper response rate for the particular engine undergoing regulation.

The exact nature of this invention as well as other objects and advantages thereof will be readily apparent from consideration of the following specification relating to the annexed drawings in which:

Fig. 2 shows schematically the details of the invention illustrated diagrammatically in Fig. 1.

Figure 1:
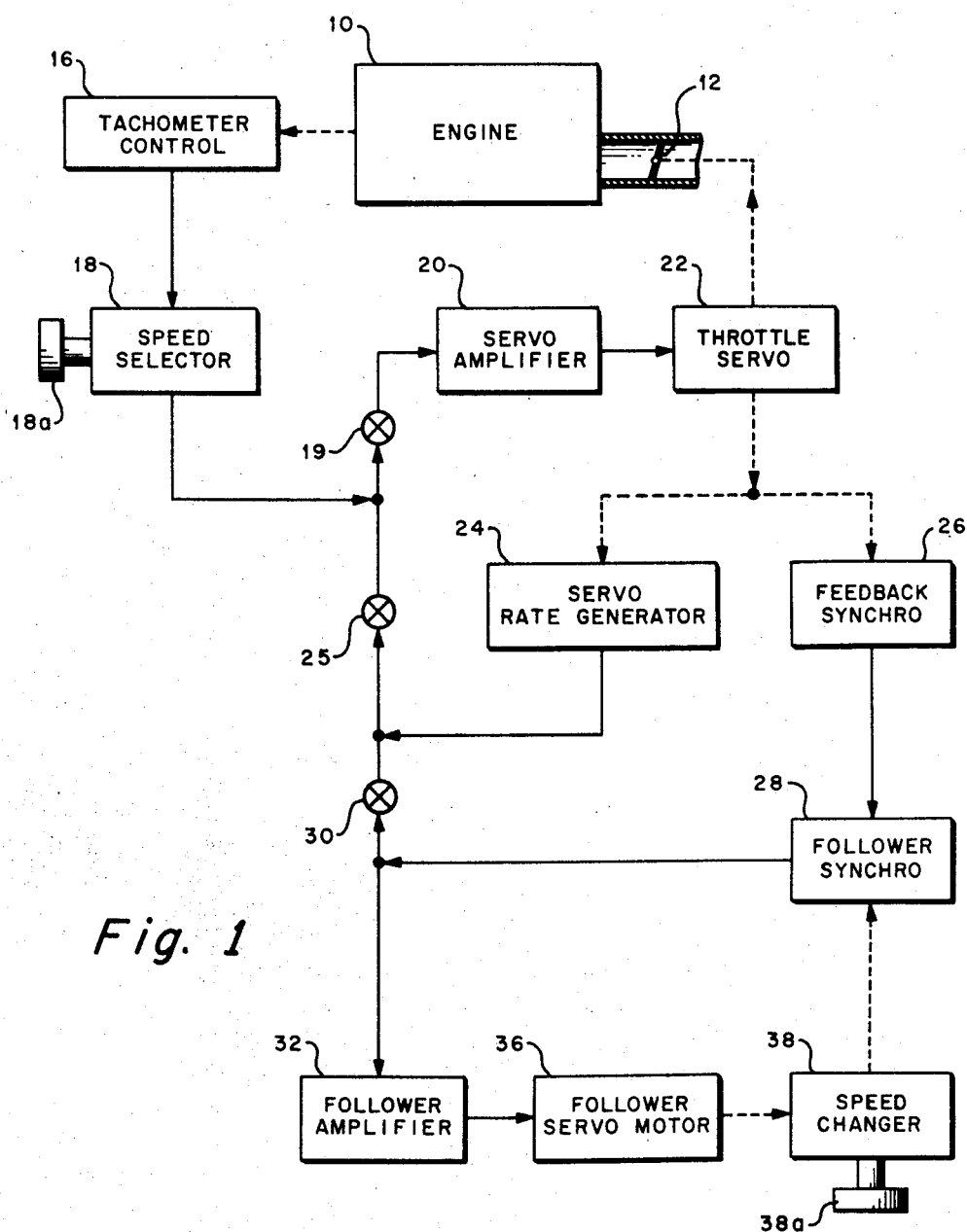
Fig. 1 is a block diagram of the inventive speed selection and control system.

Referring now to the drawings wherein like reference characters designate like or corresponding parts throughout the several views, there is shown in Fig. 1 an internal combustion engine 10 which may be the engine utilized in a helicopter for driving the main rotor thereof and which is subject to the control of this invention. Engine 10 may be provided with a conventional air throttle valve 12 which upon movement affects the speed of engine 10. Of course, in a diesel engine, the control would be exercised directly on the fuel control. A tachometer control unit 16 which may include an engine tachometer and a synchro transmitter is coupled electrically to a speed selector 18 which may include a control transformer for producing an error signal which is representative of the difference between the actual engine speed and that which has been selected.

The error signal, after being modified as hereinafter explained, is passed through an electrical parameter control 19 into servo amplifier 20, the output of which is used in throttle servo 22 to reposition throttle valve 12 in the direction of cancelling the error signal. Speed selector 18 is provided with a manual dial 18a for selecting the engine or rotor speed to be maintained by the system.

Throttle servo motor 22 is also arranged to drive a servo rate generator 24 and a feedback synchro 26. The former delivers its output signal through an electrical parameter control 25 to the input of servo amplifier 20, in opposition to the error signal. In a conventional system, feedback synchro 26 would deliver a signal which is a function of the movement of throttle servo 22 back into the input of servo amplifier 20. However, the present system provides for the output to be delivered to a follower synchro 28. The output of synchro 28 is fed simultaneously, firstly, through electrical parameter control 30 into the input of servo amplifier 20 in opposition to the error signal, and secondly, into the secondary loop consisting of a follower amplifier 32, follower servo motor 36, and speed changer 38. The latter repositions synchro 28 in a direction to cancel its output. The follower servo loop is designed to have a speed response which is slow by comparison with the helicopter engine response, for reasons explained below. Speed changer 38 has a manual control 38a for varying the gear or speed ratio between motor 36 and synchro 28.

The speed control system shown in Fig. 1 operates in the following manner:

Tachometer control 16 produces a signal which is compared with speed selector 18 for producing an error signal representing the difference between the actual engine speed and the selected engine speed, as previously noted. The error signal after being modified as hereinafter explained is amplified in servo amplifier 20 so that it may drive throttle servo 22 which repositions throttle 12 to effect the change in engine speed in a direction to cancel the error signal. As is understood in the art, feedback servo rate-generator 24 driven by throttle servo 22 supplies a feedback signal in opposition to the error signal to compensate for the effect of lag in servo amplifier 20. Feedback synchro 26, also driven by throttle servo 22, feeds its output into a follower synchro 28, which is a control transformer producing a signal output representing the difference in position between the rotor in feedback synchro 26 and the rotor in follower synchro 28. As can be seen from the block diagram, the secondary loop is utilized in such a manner that the output of follower synchro 28 is amplified in follower amplifier 32 to reposition the rotor in follower synchro 28 through a speed changer 38 so as to cause the cancellation of the output signal of synchro 28. The output of follower synchro 28 is also utilized to mix with and cancel the error signal from speed selector 18.

Consider initially engine 10 at exactly the desired speed as selected by speed selector 18. In this particular situation, no error signal will result and servo amplifier 20 will produce no output, throttle servo 22 will not rotate, and throttle 12 will remain in its position. There will also be no output from servo-rate generator 24 and feedback synchro 26 because of the lack of movement in throttle servo 22. Now assume that the load on engine has changed causing a decrease in the actual engine speed, or that speed selector 18 has been shifted by the pilot, thereby requiring a new engine speed. In this particular situation, an error signal will be produced and amplified in servo amplifier 20 to drive throttle servo 22. At this particular instant, servo-rate generator 24 will produce a signal compensating for the lag in servo amplifier 20, as is understood in the art, and feedback synchro 26 will produce a signal which tends to increase as the rotor in feedback synchro 26 moves with respect to the now stationary rotor in follower synchro 28. As throttle 12 moves to a new position gradually to bring the speed of engine 10 to the correct value, thereby increasing the relative angles between the rotor of feedback synchro 26 and follower synchro 28, the output of follower synchro 28, in opposition to the error signal from selector 18, will increase in magnitude. The output of follower synchro 28 in opposition to the error signal would tend to approach the latter and null it. However, as feedback synchro 26 rotor begins to rotate, the output of follower synchro 28, indicative of this change in angle, has its signal amplified by follower amplifier 32 to drive follower servo motor 36 to reposition the rotor of follower synchro 28 in accordance with the output of the latter and in such a direction as to null it. Hence the repositioning of the rotor of follower synchro 28 prevents the signal output of follower synchro 28 from nulling the error signal. The output of synchro 28 is always approaching zero, and throttle servo 22 is always approaching the position of nulling the error signal, that is, maintaining engine 10 at its selected speed. However, short period transient errors are virtually ignored by the follower loop because of the fact that the latter is designed to have a slow speed response by comparison with that of the engine, as previously noted.

The presence of speed changer 38 alters the mechanical ratio between follower servo motor 36 and follower synchro 28 and is adjusted for the particular engine which is in use, representing in effect, the time constant or response characteristic of the particular engine. The adjustment of speed changer 38 determines the response rate of the secondary loop and how close the rotor of synchro 28 follows synchro 26 and throttle servo 22.

Fig. 2 shows the operative mechanical and electrical details which will bring about the proper functioning of the servo system shown in Fig. 1. Tachometer control 16 consists of a tachometer 40 geared to engine 10 for positioning rotor 41 of a synchro transmitter 42. Rotor 41 is connected between a source of A.C. supply at the proper voltage in transformer unit 43 and ground. The stationary wiring of transmitter 42 consists of the coils 44, 46 and 48, which are connected in a conventional manner to the stationary coils 50, 52 and 54 of the r.p.m. or speed selector control transformer 55. The latter, along with r.p.m. selector dial 57 for positioning rotor 56, comprise the r.p.m. or speed selector 18. A manual control 18a positions rotor or rotatable coil 56 thereby selecting the operating speed of engine 10. Selector 57 is provided with a dial indicator graduated in engine speed.

Rotatable coil 56 is connected across potentiometer $K_1$ having an adjustable contact for picking off the input to servo amplifier 20. The output of servo amplifier 20 is delivered to throttle servo 22 which consists of a variable phase coil 58 and a stationary phase coil 60. Servo motor 22 is connected mechanically to drive throttle valve 12 through an electro-magnetic clutch 13, a servo rate generator 24, and rotor 64 of feedback synchro transmitter 26.

Servo rate-generator 24 consists of a stationary phase coil 66 connected between ground and a tap of transformer 43 for its voltage supply and a variable phase coil 68 connected across a rate potentiometer $K_2$. The latter's adjustable tap is connected to one end of potentimeter $K_1$. Rotatable coil 64 of feedback synchro transmitter 26 is inductively coupled to the triple coiled stator consisting of coils 70, 72 and 74, which are connected in a conventional manner to the stator of follower synchro control transformer 28 consisting of the stationary coils 76, 78 and 80. Rotatable coil 82 of follow-up synchro 28 is connected between ground and its output connection to produce an output which is deliverable simultaneously to the ungrounded end connection of follow-up potentiometer $K_3$ and the input of follower ampliger 32. The movable tap of potentiometer $K_3$ is connected to one end of potentiometer $K_2$. The output of follower amplifier 32 is fed into the variable phase coil 84 of follower servo motor 36. The constant phase stator coil 86 is connected between ground and to a source of A.C. power through switching apparatus to be described below. Follower servo motor 36 repositions rotatable coil 82 of follower synchro 28 through an adjustable speed changer 38 which is subject to manual adjustment for reasons to be further described. Speed changer 38 is provided with a manual control 38a for setting the proper speed ratio.

So far there has been described the basic servo system as shown in block form in Fig. 1, and functioning in the manner described. The arrangement of potentiometers $K_1$, $K_2$ and $K_3$ is for the purpose of providing that the feedbacks subtract properly from the error signal emitted from selector 18. The adjustable taps on these potentiometers are adjustments which are made only once in connection with the particular system and the particular engine being used.

In conjunction with this novel servo system there has been provided an arrangement of switches, safety devices, and standby controls to make the described servo system an efficient and properly functioning arrangement. Included in this arrangement are a pair of relays $R_1$ and $R_2$, and a power supply panel board 90. The latter has connections for a three phase A.C. power, one phase of which is grounded, and a D.C. source $E_1$. Relay $R_1$ includes an inductance $I_1$ which is connected in the usual manner to actuate a pair of switches $S_1$ and $S_2$. Relay $R_2$ consists of an inductance $I_2$ which is disposed in such a manner as to actuate the switches $S_3$, $S_4$ and $S_5$. A power switch $S_7$ is placed between the D.C. supply voltage $E_1$ and the ungrounded end of coil $I_1$ of relay $R_1$.

Switch $S_1$ of relay $R_1$ is connected between phase $\phi_1$ of the power supply and one primary end of power supply transformer 43. Switch $S_2$ is connected between phase $\varphi_2$ of the A.C. power supply and the power input to follow amplifier 32 which includes its own rectifying circuit.

In relay $R_2$, switch $S_3$ is located in a circuit connecting switch $S_7$, disconnect switch $S_8$ and limit switches $S_9$, $S_{10}$. A normally open push-button switch $S_{11}$ is connected across relay switch $S_3$, between D.C. power supply switch $S_7$ and normally closed push-button switch $S_8$. A signal light $L_1$ is connected between the common connection of switches $S_{11}$ and $S_8$, and ground. Light $L_1$ indicates when D.C. current is being drawn through relay $R_2$. Switch $S_4$ of relay $R_2$ is connected between the positive D.C. power supply $E_1$ and electro-magnetic clutch 13. A condenser $C_1$ across the terminals of switch $S_4$ prevents arcing. Swith $S_5$ is connected between the terminal of switch $S_2$ of relay $R_1$ on the remote side of the A.C. power supply phase $\phi_2$ through a test switch $S_{12}$ to the stationary phase coil 86 of follower servo motor 36. It will be noted that as arranged, transformer 43 provides proper A.C. voltages to amplifies 20 and 32, and to the various constant phase coils throughout the system.

To initiate operation of the system, switch $S_7$ is closed by the operator to apply the positive D.C. supply voltage $E_1$ to relay $R_1$, closing switches $S_1$ and $S_2$. The closing of these switches by the operation of relay $R_1$ supplies voltage to throttle servo 22, transformer 43, rotatable coil 41 of tachometer synchro transmitter 42, servo amplifier 20, and follower amplifier 32. Only magnetic clutch 13 and follower servo motor 36 remain without energization. Under these conditions, which may be described as the standby state of the system, the whole system will be zeroed out and will be in a position to function immediately following the next step in setting the system into operation. With the system at standby, the operator is in a position to bring immediately the system into the control of engine 10 by merely closing switch $S_{11}$. The closing of this switch applies the positive D.C. voltage $E_1$ through relay $R_2$ and signal light $L_1$. The lighting of signal light $L_1$ would indicate to the operator that at the time of pressing switch $S_{11}$, power is in fact being supplied to relay $R_2$. Actuating of relay $R_2$ causes the closing of switches $S_3$, $S_4$ and $S_5$. The closing of switch $S_3$ bypasses switch $S_{11}$ so that when switch $S_{11}$ is released by the operator there remains a continuous circuit through switch $S_3$, disconnect switch $S_8$ and limit switches $S_9$ and $S_{10}$ for maintaining energization of relay $R_2$. The closing of switch $S_4$ by the action of relay $R_2$ applies the D.C. voltage supply $E_1$ to electro-magnetic clutch 13, thereby clutching the throttle 12 mechanically to throttle servo 22. The closing of $S_5$ by the operation of relay $R_2$ will also result in the application of the power supply through switch $S_2$ in relay $R_1$ to the constant phase coil 86 of follower servo motor 36. Hence, with the closing of switch $S_{11}$ the operator or pilot of the helicopter has placed the whole system into operation. The system, of course, will function in the manner described in connection with Fig. 1. In order to disconnect the operation of the whole system, the pilot or operator merely pushes disconnect button switch $S_8$ which is normally engaged. When this is done, relay $R_2$ becomes deenergized causing the opening of switches $S_3$, $S_4$ and $S_5$, returning the whole system back into a standby condition with electro-magnetic clutch 13 disengaged and follower servo motor 36 without power. The system may again be engaged by the pilot or operator by momentarily engaging switch $S_{11}$. As long as switch $S_7$ is closed, all of the amplifiers and electronic equipment except clutch 13 and motor 36, will be warmed up and in a state for instant action. In addition, the basic servo loop will be all zeroed out so that the momentary closing switch $S_{11}$ will bring about the smooth, immediate operation of the system.

Limit switches $S_9$ and $S_{10}$ represent the safe operative limits of throttle valve 12 should the system tend to either close or open valve 12 beyond what is considered the safe limits for engine operation.

There has thus been provided a novel control system for the control of an internal combustion engine, especially one that is driving the main rotor of a helicopter. The inventive system is capable of accurate and close control of the engine speed at the value selected by the operator, and is inherently stable since the follow-up loop will not respond to transient error signals of small duration.

Of course, it is possible to make many changes in the apparatus without departing from the principles of this invention. Known equivalent mechanical elements may be substituted for the various particular units as long as the basic relationships are maintained. Hence, it should be understood that the foregoing disclosure relates to only a preferred embodiment of the invention and that numerous modifications or alterations may be made therein without departing from the spirit of the invention as set forth in the appended claims.

What is claimed is:

1. Engine control apparatus for maintaining the speed of the main rotor engine of a helicopter within predetermined limits during any powered flight condition comprising synchro means for producing a first signal as a function of the actual speed of said engine, speed selective means for producing a second signal as a function of a preselected engine speed, means responsive to said synchro means and said speed selective means for producing an error signal that is a function of the difference between said first and second signals, servo circuit means for amplifying said error signal, servo motor means actuated by the output of said servo circuit means for readjusting said engine speed in the direction of said preselected engine speed, negative feedback means which includes a feedback synchro and a follower synchro connected between said servo motor means and said servo amplifier, and means including a follower amplifier and a follower servo motor for neutralizing the effect of said fedback means until said engine has had an opportunity to change in speed to its selected value.

2. Engine control apparatus for maintaining the speed of the main rotor engine of a helicopter within predetermined limits during any powered flight condition comprising synchro means for producing a first signal as a function of the actual speed of said engine, speed selective means for producing a second signal as a function of a preselected engine speed, means responsive to said synchro means and said speed selective means for producing an error signal that is a function of the difference between said first and second signals, servo circuit means for amplifying said error signal, servo motor means actuated by the output of said servo circuit means for readjusting said engine speed in the direction of said preselected engine speed, a first negative feedback circuit which includes a servo rate generator connected between said servo motor means and said servo amplifier circuit means, a second negative feedback circuit which includes a feedback synchro and a follower synchro in parallel with said first feedback circuit, and means including a follower amplifier and a follower servo motor for neutralizing the effect of said second feedback circuit until said engine has had an opportunity to change in speed to its selected value.

3. Engine control apparatus for maintaining the speed of the main rotor engine of a helicopter within predetermined limits during any powered flight condition comprising synchro means for producing a first signal as a function of the actual speed of said engine, speed selective means for producing a second signal as a function of a preselected engine speed, means responsive to said synchro means and said speed selective means for producing an error signal that is a function of the difference between said first and second signals, servo circuit means for amplifying said error signal, servo means actuated by the output of said circuit means for altering the speed of said engine in the direction of said selected speed, negative feedback means which includes a feedback synchro and a follower synchro connected between said servo means and said servo amplifier circuit for producing a signal in opposition to said error signal, and means including a follower amplifier and a follower servo motor for neutralizing the effect of said feedback means until said engine has had an opportunity to change in speed to its selected value, said latter named means including means to select its rate of response for the particular engine response characteristic thereby insuring a stable control thereof.

4. In a speed control for a rotating member, means for selecting an operating speed of said member, means providing a first electrical signal which is a function of the difference between the actual operating speed and said selected speed of said member, first servo means responsive to said first electrical signal for altering the actual operating speed of said rotating member in the direction of said selected speed of said member, feedback means from said first servo means for providing a second electrical signal which is a function of the movement of said first servo means in altering the operating speed of said member, said feedback means including a follower synchro, means subtracting said second electrical signal from said first electrical signal for producing a servo input to said first servo means, and second servo means responsive to said second electrical signal for rebalancing said synchro in the direction of nulling said second electrical signal, thereby promoting stable operation of said speed control.

5. In a speed control for a rotating member, means for selecting an operating speed of said member, means providing a first electrical signal which is a function of the difference between the instantaneous operating speed and said selected speed of said member, first servo means for altering the operating speed of said rotating member in the direction of said selected speed of said member, servo rate generator means from said first servo means for providing a second electrical signal which is a function of the movement of said first servo means in altering the operating speed of said member, follower means including a follower synchro for producing a third electrical signal, means subtracting said second electrical signal from said first electrical signal for producing a servo input to said first servo means, second servo means responsive to said third electrical signal for rebalancing said synchro in the direction of nulling said third electrical signal, and variable speed transmission means between said second servo means and said follower means for permitting adjustment of the speed ratio therebetween, thereby permitting adjustment of the speed control for its most stable operation.

6. In a speed control for a rotating member, means for selecting an operating speed of said member, means providing a first electrical signal which is a function of the difference between the instantaneous operating speed and said selected speed of said member, first servo means for altering the operating speed of said rotating member in the direction of the selected speed of said member, first feedback means from said first servo means for providing a second electrical signal which is a function of the movement of said first servo means, follower means including a follower synchro driven by said first feedback means for producing said second electrical signal, second feedback means from said first servo means for providing a third electrical signal which is a function of the velocity of said first servo means for compensating for electrical lag in said first srevo means, means subtracting said second and third electrical signals from said first signal for producing a servo input to said first servo means, second servo means responsive to said second electrical signal for rebalancing said internal adjustment in the direction of nulling said second electrical signal, and variable speed transmission means between said second servo means and said follower synchro for permitting adjustment of the speed ratio therebetween.

7. In a speed control for an internal combustion engine, means for selecting an operating speed of said engine, means providing a first electrical signal which is a function of the difference between the instantaneous operating speed and said selected speed of said engine, a speed adjusting device for said engine, first servo means for operating on said speed adjusting device and thereby altering the operating speed of said engine in the direction of said selected speed of said engine, feedback means from said first servo means for providing a second electrical signal which is a function of the movement of said first servo means in altering the operating speed of said engine, follower means for producing a third electrical signal which is a particular portion of said second electrical signal depending upon an adjustment in said follower means, means subtracting said second and third electrical signal from said first electrical signal for producing a servo input to said first servo means, second servo means responsive to said third electrical signal for rebalancing said adjustment in said follower means in the direction of nulling said third electrical signal, and variable speed transmission means between said second servo means and said follower means for permitting adjustment of the speed ratio therebetween, thereby permitting adjustment of said speed control for its most stable operation.

8. In a speed controller for a rotating member, a speed adjusting device for said member, means for selecting an operating speed of said member, means providing a first electrical signal which is a function of the difference between the instantaneous operating speed and said selected speed of said member, first servo means for actuating said speed adjusting device for altering the operating speed of said rotating member in the direction of the selected speed of said member, feedback means from said first servo means for providing a second electrical signal which is a function of the movement of said first servo means, follower means including a follower synchro for producing a third electrical signal which is a particular portion of said second electrical signal depending upon an adjustment within said synchro, means subtracting said second and third electrical signals from said first signal for producing a servo input to said first servo means, second servo means responsive to said third electrical signal for readjusting said follower synchro in the direction of nulling said third electrical signal, variable speed transmission means between said second servo means and said follower synchro for permitting adjustment of the speed ratio therebetween, electro-magnetic clutch means between said first servo means and said speed adjusting device, said clutch means being disengaged in the absence of the application of power thereto, and means to apply at will power to said clutch means.

9. In a speed controller for a rotating member, a speed adjusting device for said member, means for selecting an operating speed of said member, means providing a first electrical signal which is a function of the difference between the instantaneous operating speed and said selected speed of said member, first servo means for actuating said speed adjusting device for altering the operating speed of said rotating member in the direction of the selected speed of said member, feedback means from said first servo means for providing a second electrical signal which is a function of the movement of said first servo means, follower means including a follower synchro for producing a third electrical signal which is a particular portion of said second electrical signal depending upon an adjustment within said synchro, means subtracting said second and third electrical signals from said first signal for producing a servo input to said first servo means, second servo means responsive to said third electrical signal for readjusting said follower synchro in the direction of nulling said third electrical signal, variable speed transmission means between said second servo means and said follower synchro for permitting adjustment of the speed ratio therebetween, electro-magnetic clutch means between said first servo means and said speed adjusting device, said clutch means being disengaged in the absence of the application of power thereto, a source of power, and relay means including a switch for passing said power to said clutch upon energization of said relay means due to closing of said switch.

10. In a speed control for a rotating member, a speed adjusting device for said member, means for selecting an operating speed of said member, means providing a first electrical signal which is a function of the difference between the instantaneous operating speed and said selected speed of said member, first servo means for actuating said speed adjusting device for altering the operating speed of said rotating member in the direction of the selected speed of said member, electro-magnetic clutch means between said first servo means and said speed adjusting device, said clutch means being disengaged in the absence of the application of power, feedback means from said first servo means for providing a second electrical signal which is a function of the movement of said first servo means, follower means for producing a third electrical signal, means subtracting said second and third electrical signals from said first signal for producing a servo input to said first servo means, second servo means responsive to said third electrical signal for readjusting said follower means in the direction of nulling said third electrical signal, a source of power, relay means for supplying said power to said speed control and placing the same on a standby basis upon energization thereof, and standby switch means for energizing said relay means.

11. In a speed control for a rotating member, a speed adjusting device for said member, means for selecting an operating speed of said member, means providing a first electrical signal which is a function of the difference between the instantaneous operating speed and said selected speed of said member, first servo means for actuating said speed adjusting device for altering the operating speed of said rotating member in the direction of the selected speed of said member, electro-magnetic clutch means between said first servo means and said speed adjusting device, said clutch means being disengaged in the absence of the application of D.C. power, feedback means from said first servo means for providing a second electrical signal which is a function of the movement of said first servo means, follower means for producing a third electrical signal, means subtracting said second and third electrical signals from said first signal for producing a servo input to said first servo means, second servo means responsive to said third electrical signal for readjusting said follower means in the direction of nulling said third electrical signal, a source of A.C. power, a source of D.C. power, first relay means including at least one switch which is closed upon relay energization for supplying A.C. power to said speed control, second relay means including at least one switch which is closed upon energization for supplying D.C. power to said clutch means, standby switch means to energize said first relay means to place said control on standby basis, and further switch means for energizing said second relay means and thereby placing said control in full operation.

12. Engine control apparatus for maintaining the speed of the main rotor engine of a helicopter within predetermined limits during any powered flight condition comprising means for producing a first signal as a function of the actual speed of said engine, speed selective means for producing a second signal as a function of a preselected engine speed, means responsive to said first named means and said speed selective means for producing an error signal that is a function of the difference between said first and second signals, means for amplifying said error signal, means actuated by the output of said amplifying means for readjusting said engine speed in the direction of said preselected engine speed, negative feedback means connected between said readjusting means and said amplifying means for opposing said error signal in accordance with movement of said readjusting means, and means for neutralizing the effect of said feedback means until said engine has had an opportunity to change in speed to its selected value.

13. Engine control apparatus for maintaining the speed of the main rotor engine of a helicopter within predetermined limits during any powered flight condition comprising synchro means for producing a first signal as a function of the actual speed of said engine, speed selective means for producing a second signal as a function of a preselected engine speed, means responsive to said synchro means and said speed selective means for producing an error signal that is a function of the difference between said first and second signals, means for amplifying said error singal, servo means actuated by said error signal for altering the speed of said engine in the direction of said selected speed, negative feedback means connected between said servo means and said amplifier means for producing a signal in opposition to said error signal in accordance with movement of said servo means, means for neutralizing the effect of said feedback means until said engine has had an opportunity to change in speed to its selected value, said latter means including means to select its rate of response for the particular engine response characteristic thereby insuring a stable control of said engine.

References Cited in the file of this patent

UNITED STATES PATENTS

| | | |
|---|---|---|
| 2,301,348 | Wallgren et al. | Nov. 10, 1942 |
| 2,382,847 | Baumann | Aug. 14, 1945 |
| 2,390,084 | Edwards | Dec. 4, 1945 |
| 2,775,724 | Clark | Dec. 25, 1956 |
| 2,795,747 | Wellington | June 11, 1957 |